United States Patent Office 3,461,130
Patented Aug. 12, 1969

3,461,130
QUINONE DERIVATIVES OF IMIDAZOLES AND PYRAZOLES
Siegfried Petersen, Leverkusen, Heinrich Gold, Cologne-Stammheim, and Ekkehard Grundmann and Lieselotte Jühling, Wuppertal-Elberfeld, Germany, assignors to Farbenfabriken Bayer Aktiengesellschaft, Leverkusen, Germany, a corporation of Germany
No Drawing. Filed Apr. 28, 1965, Ser. No. 451,639
Claims priority, application Germany, Apr. 29, 1964, F 42,749
Int. Cl. C07d 49/18, 49/36
U.S. Cl. 260—309      4 Claims

ABSTRACT OF THE DISCLOSURE

Binuclear quinones such as 1,2 or 1,4 naphthoquinones, or 5,8-diketoquinolines, substituted in the quinoid ring by the group —NH lower alkylene-R, in which R represents a pseudoaromatic heterocyclic radical, such as a diazole ring, are prepared having selective action against certain tumors experimentally produced in animals.

---

The present invention is concerned with new quinone derivatives and with the preparation thereof.

Natural and synthetic quinone derivatives are known to play an important part as therapeutic agents. In recent times, especially, quinones with bactericidal, fungicidal and cytostatic properties have been described.

The present invention is concerned with new quinone derivatives which possess remarkable chemotherapeutic properties.

Besides the standard chemotherapeutic properties frequently observed in the quinone series, some of the compounds of this invention exhibit a hitherto unknown selective action against certain tumors experimentally produced in animals. With a relatively good compatibility of the new compounds, a selective chemotherapy of tumors thus becomes possible. An especially good activity was seen in the case of the Ehrlich carcinoma and Crocker sarcoma of mice, as well as of the Jansen sarcoma of rats.

From the teachings of the prior art, it can be assumed that those quinones are especially valuable in which the carbonyl function of the quinone and the non-strongly basic nitrogen of the heterocycle stand in a suitable spatial distance to one another so that the biological action of such compounds through a complex-mechanism could be conceivable.

In British patent specification No. 694,738, which is concerned with quinones with a curare effect, compounds are mentioned as intermediate products which were obtained by the reaction of primary, secondary or tertiary amines with quinones, especially with benzoquinones. However, quinone reaction products with aminoalkyl derivatives of pseudo-aromatic heterocycles, such as are described herein, have hitherto not been described. Furthermore, the hitherto unmentioned cytostatic effect of quinones of this type has not been mentioned at all or only in passing for the derivatives known from the literature so that the new preparations are, in this regard, far superior.

The novel quinones of this invention can be prepared from binuclear quinones such as 1,2-naphthoquinone, 1,4-naphthoquinone, 2-methyl-1,4-naphthoquinone and higher alkyl derivatives of the same type; 5,6,7,8-tetrahydro-1,4-naphthoquinone, 2-acetylamino - 3-chloro-1,4 - naphthoquinone, 2-amino - 3-chloro-1,4 - naphthoquinone-N-carboxylic acid ethyl ester, 3-chloro-1,4-naphthoquinone-2-malonic acid diethyl ester, 3-chloro-1,4-naphthoquinone-2-malonic acid diethyl ester, 3-chloro-1,4-naphthoquinone-2-(diacetyl-methane), etc., as well as halogen derivatives of the quinones, for example, 2,3-dichloro-naphthoquinones and 2,3-dichloro-5,6,7,8-tetrahydro - 1,4-naphthoquinone. Furthermore, heterocyclic quinones, such as 5,8-diketo-quinoline, and 6,7-dichloro - 5,8-diketo-quinoline, may be employed.

These binuclear quinone derivatives which contain halogen substituents on the quinone portion of the ring usually react by substitution of the amine compound for one or more of the halogens. Those quinone derivatives may also be considered which, instead of a halogen atom, contain other exchangeable substituents, such as a sulpho group; there may be mentioned, for example, 1,2-naphthoquinone-4-sulphonic acid and 6-nitro - 1,2 - naphthoquinone-4-sulphonic acid or their salts. As exchangeable substituents in the quinone derivatives, there may also be mentioned methoxy groups, for example, 2,3-dimethoxy-1,4-naphthoquinone and 6,7-dimethoxy-5,8-diketo - quinoline. Finally, there can also be used as quinone derivatives, compounds with a modified carbonyl function.

These binuclear quinones and quinone derivatives are then further reacted with amines of the general formula HRN—R'—Het wherein R is hydrogen or lower (1–4 carbon atoms) alkyl, R' is lower alkylene, usually a polymethylene radical of 1 to 4 carbon atoms, and Het stands for a mononuclear, pseudoaromatic 5- or 6-membered heterocycle, which contains at least one nitrogen atom and may be substituted by lower alkyl or alkoxylalkyl groups. Thus the heterocycle consists of 1–5 nitrogens and 1–5 carbons.

The symbol Het in the above-given general formula thus includes, for example, the following 5-membered rings: pyrrole, oxazole, isoxazole, thiazole, isothiazole, imidazole, pyrazole, the various isomeric triazoles, oxadiazole and tetrazole; as well as the following 6-membered rings: pyridine, pyridazine, pyrimidine, pyrazine and the various isomeric triazines. The aminoalkyl group can be connected with the heterocycle not only at a carbon atom but also at a nitrogen atom.

The amines used are prepared in known manner, for example, by hydrogenation of the corresponding nitriles. Thus, the aminoethyl pyridines are obtained from the various isomeric cyanopyridines. If the heterocycle carries a cyanomethyl group, then compounds with a basic side chain of 2 carbon atoms are obtainable. For example, 1-(cyanomethyl)-1,2,3-triazole yields, upon hydrogenation, 1-(β-aminoethyl) - 1,2,3 - triazole. Cyanoethylation products of heterocycles, for example, of imidazole or pyrazole, which, upon hydrogenation, yield side chains of 3 carbon atoms, are very readily obtainable. However, other methods for the preparation of the desired starting amines are also conceivable; for example, the reaction of chloralkyl compounds of the mentioned heterocycles with ammonia or primary amines.

For further explanation, a few specific bases are mentioned by way of example: 2-, 3- and 4-aminomethylpyridine, 1-β-aminoethyl - 1,2,3 - triazole, 1-α - aminopropyl - 1,2,3 - triazole, 1 - β - aminoethyl - 4-methoxymethyl - 1,2,3 - triazole, 1 - β - aminoethyl - 4,5 - bis-methoxymethyl - 1,2,3 - triazole, 2-β-aminoethyl - 1,2,3-triazole, 1-α-aminopropyl-imidazole, 1-α-aminopropyl-pyrazole, 1-α-aminopropyl-3-methylpyrazole and N-aminopropyl-triazine derivatives.

The novel compounds of this invention are binuclear quinones substituted in a position ortho to a keto group of the quinone with the amino group of an aminoalkyl of 1–4 carbon atoms which is substituted with a 5 or 6 member nitrogen-containing heterocycle. The other ortho position of the quinone ring may have hydrogen, halogen, alkyl, alkoxy, N-alkamide, an amino group similar to the other ortho substituent, an amino acid ester residue, etc. For example, a compound has been made in which the second ortho group of the quinone is attached to the alpha carbon of methyl-β-(β-1,2,3 triazolylethylamino) butyrate. The aminoalkyl portion is generally a secondary amine. The heterocycle is usually a one-nitrogen heterocycle like pyridine or pyrole, or a two-nitrogen heterocycle like imidazole pyrazole or three-membered like triazole. The mono- or dialkyl or alkoxyalkyl derivatives of these heterocycles may also be employed.

The proportions in which the reaction components are reacted with one another may vary within wide limits; suitable proportions can readily be ascertained in each case by preliminary experiments. The reactants will be used in molar quantities at least sufficient to provide a suitable amount of the desired product, but an excess of one or more of the reagents may be employed to assure more complete reaction of the other. The reaction preferably is carried out in a solvent, such as methanol, ethanol or higher alcohols, tetrahydrofuran, glycol monomethyl ether acetate or dimethyl formamide. Benzene, toluene or chlorobenzene may also be used. Water, in particular, is to be preferred for water-soluble quinone-sulphonic acids. When acid is split off in the reaction, this can be taken up either by an excess of the basic component or by the addition of an acid acceptor, such as a tertiary amine. If the reaction takes place by an addition mechanism, then, as is known, hydroquinones are first formed which must be further oxidized by suitable oxidizing agents, i.e., excess quinone or, in the simplest case, oxygen or air.

The reactions are carried out at temperatures between 0° C. and the boiling point of the solvent. The reaction products are generally the purer, the lower the possible reaction temperature. In general, the compounds obtained are orange, red, brown or olive-colored. They can be purified by recrystallization.

The following examples will serve to illustrate the practice of the invention.

EXAMPLE I 31.6 parts finely powdered 1,4-naphthoquinone, recrystallized from white spirit (benzene), are placed in 300 parts alcohol. 24 parts 1-(β-aminoethyl)-1,2,3-triazole are added dropwise, with stirring, and the temperature is kept at 30° C. by cooling. Air is subsequently blown into the reaction mixture for three hours. Red-brown crystals separate which are purified by recrystallization from glycol monomethyl ether acetate.

Yield: 28.7 parts of a material which has a redder appearance after recrystallization, and is analytically pure. The compound has the empiral formula $C_{16}H_{12}O_2N_4$ and is 2 - [β - (1,2,3 - triazolyl - (1)) - ethylamino] - 1,4-naphthoquinone of the following formula:

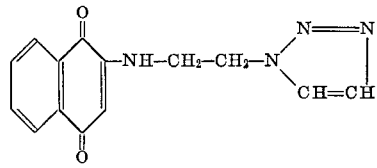

The following quinone derivatives were prepared in a similar manner from the given quinones and amines.

From 1,4-naphthoquinone:

EXAMPLE II

Plus 1-(β-aminoethyl)-4,5-bismethoxymethyl-1,2,3-triazole and recrystallized from methanol

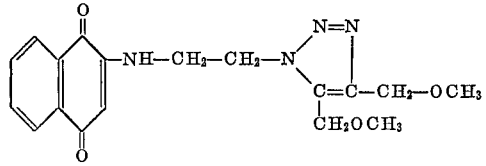

Color: yellow-brown; melting point: 110 to 111° C.

EXAMPLE III

Plus 1 (α-aminopropyl)-imidazole and recrystallized from glycol monomethyl ether acetate

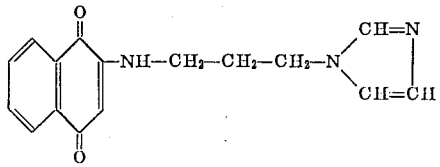

Color: brown; melting point: 172 to 174° C.

EXAMPLE IV

Plus 1 (α-aminopropyl)-4-methyl-pyrazole and recrystallized from glycol monomethyl ether acetate:

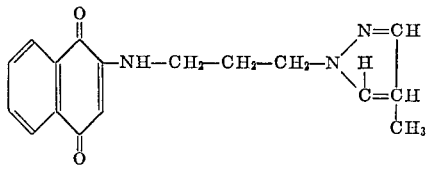

Color: brown; melting point: 147 to 149° C.

EXAMPLE V

Plus 2-(aminomethyl)-pyridine, and recrystallized from glycol monomethyl ether acetate. The reaction is advantageously carried out in tetrahydrofuran:

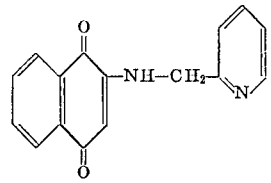

Color: golden brown; melting point: 151 to 152° C.

EXAMPLE VI

Plus 4-(aminomethyl)-pyridine and recrystallized from alcohol:

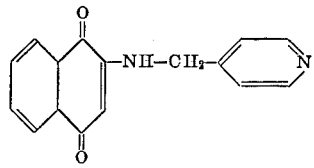

Color: orange; melting point; 166° C.

EXAMPLE VII

Plus 1-(α-aminopropyl)-pyrrole and recrystallized from toluene:

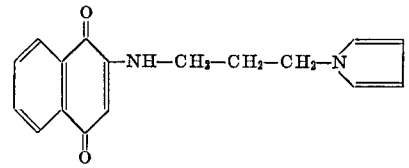

Color: brown; melting point: 147° C.

EXAMPLE VIII

Plus 1-(α-aminopropyl)-1,2,3-triazole and recrystallized from dimethyl formamide:

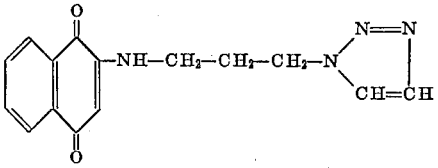

Color: orange-brown; melting point: 212–213° C.

EXAMPLE IX

Plus 2-(α-aminopropyl)-1,2,3-triazole, and recrystallized from glycol monomethyl ether acetate:

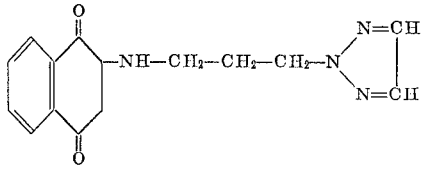

Color: brown; melting point: 152–153° C.

EXAMPLE X

Plus 1-(α-aminopropyl)-pyrazole and recrystallized from alcohol or toluene:

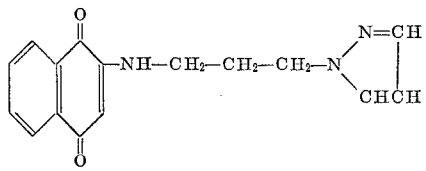

Color: orange-brown; melting point: 149–150° C.

EXAMPLE XI

Plus 1-(α-aminopropyl)-2,5-dimethyl-pyrrole, and recrystallized from dimethyl formamide:

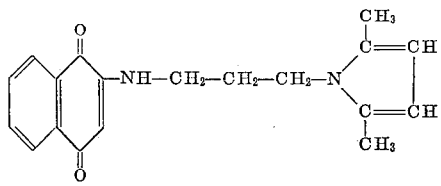

Color: orange-brown; melting point: 192° C.

EXAMPLE XII

Plus 3-(aminomethyl)-pyridine and recrystallized from glycol monomethyl ether acetate:

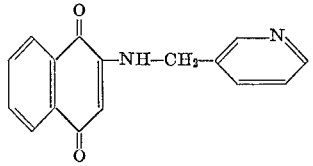

Color: organge; melting point: 208–209° C.

EXAMPLE XIII

The following was made from 2-methyl-1,4-naphthoquinone plus 1-(β-aminoethyl)-1,2,3-triazole and recrystallized from alcohol to which some dimethyl formamide had been added:

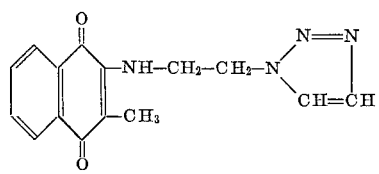

Color: brown-red; melting point: 163 to 165° C.

EXAMPLE XIV

The following was made from 5,8-diketoquindine plus 1-(β-aminoethyl)-1,2,3-triazole, recrystallized from dimethyl formamide:

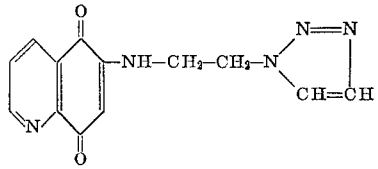

Color: orange; melting point: 235–237° C.

EXAMPLE XV 55.2 parts potassium 1,2-naphthoquinone-4-sulphonate are suspended in 400 parts water and 22.4 parts 1-(β-aminoethyl)-1,2,3-triazole, diluted with an equal amount of alcohol, are added at room temperature. The reaction mixture dissolves with a dark color, but the desired condensation product soon separates in the form of a brown-red powder. It is recrystallized from a mixture of 40 parts dimethyl formamide and 60 parts water. However, as a result of the purification which causes considerable losses, the yield amounts to only about 30 percent of that expected. The 4 - [β - (1,2,3-triazolyl - (1)) - ethylamino]-1,2-naphthoquinone so obtained decomposes at 244 to 247° C.

EXAMPLE XVI 45.2 parts 6,7-dichloro-1,4-quinonepyridine(6,7-dichloro - 5,8 - diketoquinoline) are covered with a solution of 24 parts 1-(β-aminoethyl)-1,2,3-triazole in 500 parts methanol. 22 parts triethylamine are added, the reaction mixture is stirred for 12 hours at 40° C. and the red condensation product is filtered off with suction. It is purified by recrystallization from dimethyl formamide and then melts at 197° C. Yield 52.5 parts. The compound of the empirical formula $C_{13}H_{10}O_2N_5Cl$ is 6-[β-(1,2,3-triazolyl-(1)) - ethylamino]-7-chloro-5,8-diketoquinoline of the formula:

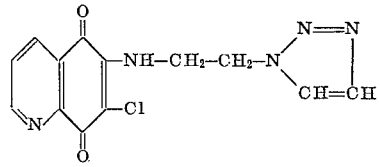

The following compounds are obtained in a similar manner:

EXAMPLE XVII

From 2,3-dichloro-1,4-naphthoquinone and 1-(β-aminoethyl)-1,2,3-triazole, recrystallized from dimethyl formamide

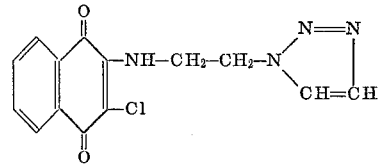

Color: orange-red; melting point: 203 to 204° C.

EXAMPLE XVIII

From 5,6,7,8-tetrahydro - 2,3 - dichloro - 1,4-napthoquinone and 1-(β-aminoethyl)-1,2,3-triazole, recrystallized from glycol monomethyl ether acetate.

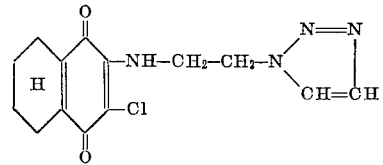

Color: dark red; melting point: 158 to 159° C.

EXAMPLE XIX

From 6,7 - dichloro-5,8-diketoquinoline and 1-(β-aminoethyl) - 4,5 - bis - methoxymethyl - 1,2,3 - triazole, recrystallized from alcohol:

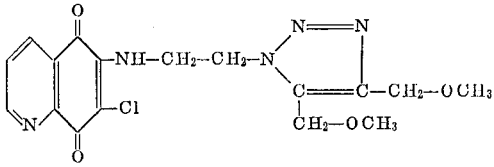

Color: brown; melting point: 128 to 132° C.

EXAMPLE XX 21.8 parts of 2,3-dimethoxy-1,4-naphthoquinone are stirred together with a solution of 16 parts 1-(β-aminoethyl)-1,2,3-triazole in 220 parts alcohol for 5 hours at 50° C. and then boiled under reflux for 5 hours. Voluminous, deep red crystals are formed which, when recrystallized from alcohol, melt at 129° C. The yield of 2-[β-(1,2,3 - triazolyl - (1)) - ethylamino] - 3 - methoxy - 1,4-naphthoquinone is 19.4 parts.

EXAMPLE XXI

In a similar manner, there is formed from 2,3-dimethoxy - 1,4 - naphthoquinone and 1 - (β - aminoethyl) - 4,5-dimethyl - methyl) - 1,2,3 - triazole, a brick red quinone $C_{19}H_{22}O_5N_4$ which, when recrystallized from methanol, melts sharply at 112° C. on a Kofler block, and somewhat less sharply at 105 to 109° C. in a tube.

EXAMPLE XXII

The corresponding condensation product from 2,3-dimethoxy - 1,4 - naphthoquinone and 1-(β-aminoethyl)-4-methoxymethyl-1,2,3-triazole melts, after recrystallization from toluene, at 126 to 128° C.

Furthermore, there may be mentioned the condensation products from 2,3-dimethoxy-1,4-naphthoquinone with 2- or 4-aminomethyl-pyridine in which a methoxy group is again replaced by the basic radical:

EXAMPLE XXIII

Recrystallized from glycol monomethyl ether acetate:

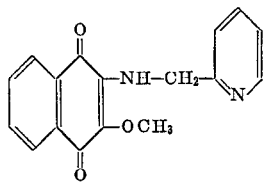

Color: almost black; melting point: 166 to 167° C.

EXAMPLE XXIV

Recrystallized from glycol monomethyl ether acetate:

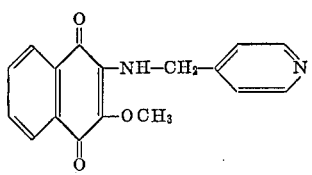

Color: black-red; melting point: 151 to 153° C.

When 6,7-dimethoxy-5,8-diketoquinoline is reacted in methanol with 1-(β-aminoethyl)-1,2,3-triazole, two different compounds can be isolated from the reaction mixture. First there crystallizes out a less readily soluble product (XXV) in the form of black-red rodlets which can be recrystallized from a large quantity of alcohol; M.P. 160° C. (Kofler block). After concentration, there can be isolated from the mother liquors a second, more readily soluble crystallizate (XXVI) which, recrystallized from alcohol, melts at 152° C. and, according to spectroscopy, is different from the first crystallizate. To the two compounds, which have the same gross formula $C_{14}H_{13}O_3N$, there are assigned the following isomeric formulae:

EXAMPLE XXV

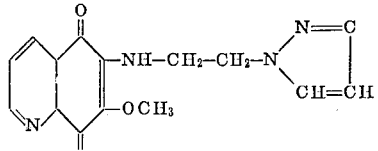

EXAMPLE XXVI

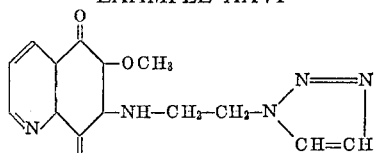

XXV is formed in a larger amount.

EXAMPLE XXVII 56 parts 2-amino-3-chloro-1,4-naphthoquinone-N-carboxylic acid ethyl ester are suspended in 300 parts alcohol. A mixture of 24 parts 1-(β-aminoethyl)-1,2,3-triazole, 22 parts triethylamine and 150 parts alcohol is added dropwise, the reaction mixture thereby changing its color. After boiling under reflux for 5 hours, the brown-red crystals separated from the dark solution are filtered off with suction. Yield 52 parts. Purification is carried out by recrystallization from glycol monomethyl ether acetate (M.P. 194 to 195° C.). The condensation product has the following formula:

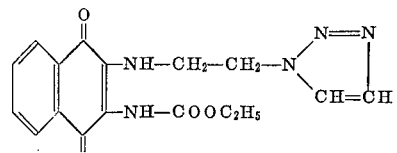

EXAMPLE XXVIII

In an analogous manner, there is formed from 2-acetylamino-3-chloro - 1,4 - naphthoquinone and 1-(β-aminoethyl)-1,2,3-triazole, the compound of the formula:

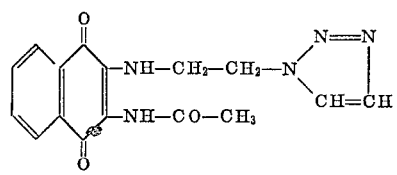

in the form of red crystals; melting point 208 to 210° C.

EXAMPLE XXIX

When 29 parts 2-chloro-1,4-naphthoquinone-2-(diacetylmethane) are boiled for two hours with excess (36 parts) 1-(β-aminoethyl)-1,2,3-triazole, there is first observed a bluish coloration which quickly changes to orange-red and later to violet. The hot reaction product is filtered off with suction and recrystallized from dimethyl formamide. The least soluble parts (about 10 parts) melt at 233 to 237° C. in a tube and at 240° C. on a Kofler block. According to elementary analysis, 2 mols of the amine react with the quinone. The condensation product $C_{23}H_{43}O_5N_8$ may have the following structure:

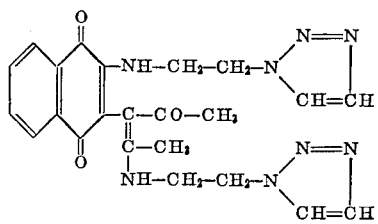

Some of the starting products required in the above examples are new. Their preparation is as follows:

1-(β-aminoethyl)-1,2,3-triazole

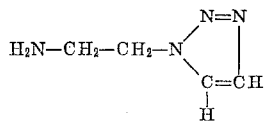

108 grams 1-cyanomethyl-1,2,3-triazole (boiling point 118° C./0.2 mm. Hg; obtainable from azidoacetonitrile and acetylene) are hydrogenated for 1 hour in 400 milliliters tetrahydrofuran at 85° C. and 120 to 150 atmospheres in the presence of Raney cobalt. After distilling off the tetrahydrofuran there remains an oily residue from which 74 grams of the amine can be distilled; yield 66 percent; boiling point 116° C./0.3 mm. Hg; $n_D^{20}$ 1.5120.

1-(β-aminoethyl)-4,5-bis-methoxymethyl-1,2,3-triazole

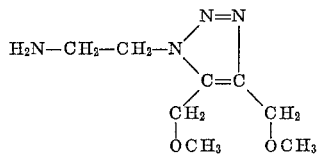

196 grams 1-cyanomethyl-4,5-bis-methoxymethyl-1,2,3-triazole (obtainable from azidoacetonitrile and but-2-yne-1,4-diol-dimethyl ether) are analogously hydrogenated in 650 milliliters tetrahydrofuran and the amine is isolated by distillation; yield 72 percent; boiling point 133° C./0.2 milliliters Hg; $n_D^{20}$ 1.4999.

1-(α-aminopropyl)-imidazole

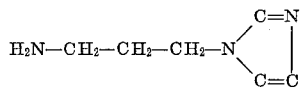

121 grams crude 1-(β-cyanoethyl)-imidazole (obtainable from imidazole and acrylonitrile in known manner) are hydrogenated in 240 milliliters tetrahydrofuran in the presence of 35 grams Raney cobalt and 45 milliliters ammonia at 90 to 95° C. and 120 to 140 atmospheres; yield 79 percent; boiling point 98 to 100° C./0.2 mm. Hg; $n_D^{20}$ 1.5790.

1-(α-aminopropyl)-4-methyl-pyrazole

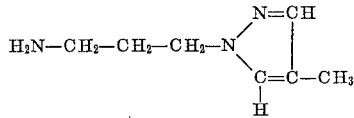

135 grams crude 1-(β-cyanoethyl)-5-methyl-pyrazole (obtainable from 5-methyl-pyrazole and acrylonitrile) are hydrogenated as described for 1-(β-cyanoethyl)-imidazole; yield 81 percent; boiling point 72 to 74° C./0.2 mm. Hg; $n_D^{20}$ 1.5030.

EXAMPLE XXX

A mixture of 18.8 parts 2-methoxy-1,4-naphthoquinone, 100 parts alcohol and 11 parts 2-(aminomethyl)-pyridine is boiled under reflux for 2 hours. After cooling, there separate from the somewhat greenish solution, 13 parts of an orange-red-brown crystallizate which is purified by recrystallization from glycol monomethyl ether acetate or toluene.

With the exchange of the methoxy group for the amine radical, 2 - (α - pyridyl - methylamino) - 1,4 - naphthoquinone (melting point 151–152° C.) is formed which has already been described in Example V.

EXAMPLE XXXI 26 parts 1-(β-aminoethyl)-1,2,3-triazole are added to a suspension of 37.6 parts 2-methoxy-1,4-naphthoquinone in 300 parts alcohol and the mixture is boiled under reflux for 5 hours. From the somewhat greenish solution, beautiful red crystals then separate which are filtered off with suction, while hot, and dried. Yield 30 parts. After cooling, 9 parts of a less pure material separate from the mother liquors.

The main amount is analytically pure 2-(β-(1,2,3-triazolyl - (1)) - ethylamino - 1,4 - naphthoquinone which is identical with the compound obtained in Example I. Recrystallization from glycol monomethyl ether acetate gives no improvement of the physical data.

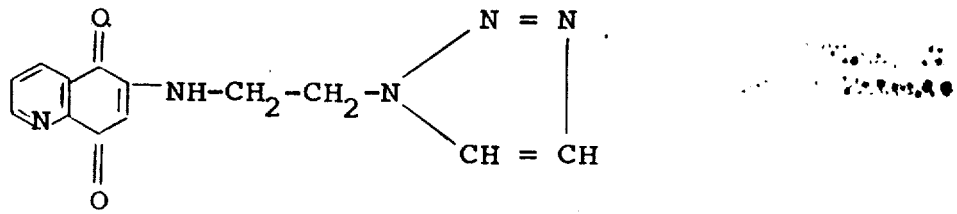

6. In column 8, Example XXVI, the formula has been changed to:
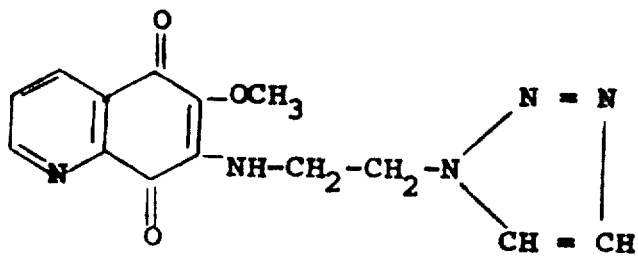
7. In column 9, line 31, "millileters" has been changed to --millimeters--.
8. In column 9, line 35, the formula has been changed to:
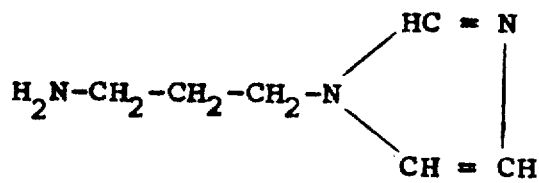

What is claimed is:

1. A quinone of the formula

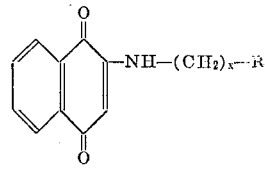

wherein x represents an integer of 1 to 4 inclusive and R represents a radical selected from the group consisting of imidazolyl, pyrazolyl, lower alkyl substituted imidazolyl and lower alkyl substituted pyrazolyl.

2. The compound of the formula:

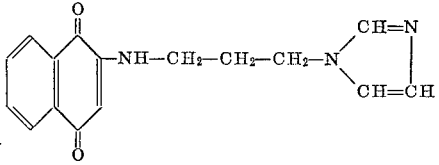

3. The compound of the formula:

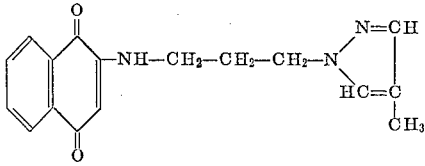

4. The compound of the formula:

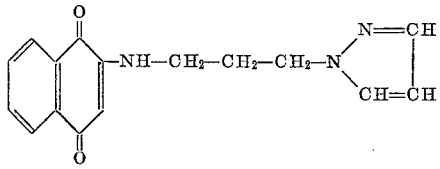

References Cited

UNITED STATES PATENTS

| 2,850,502 | 9/1958 | Rudner | 260—288 |
| 3,040,041 | 6/1962 | Schellhammer | 260—288 |
| 3,108,108 | 10/1963 | Schellhammer | 260—288 |
| 3,121,086 | 2/1964 | Sartori | 260—288 |

FOREIGN PATENTS 694,738   7/1953   Great Britain.

OTHER REFERENCES

Grandberg et al.: Chem. Abst., vol. 57, column 9839 (1962).

Lur'e et al.: Chem. Abst., vol. 34, columns 4387–8 (1940).

Oeriu: Chem. Abst., vol. 59, columns 6326–7 (1963).

U.S. Rubber Co., Chem. Abst., vol. 57, column 1503 (1962), (abst. of Belgian Patent 614, 136).

HENRY R. JILES, Primary Examiner

NATALIE TROUSOF, Assistant Examiner

U.S. Cl. XR.

260—250, 256, 288, 296, 302, 307, 308, 310, 326, 396, 999

PO-1050
(5/69)

UNITED STATES PATENT OFFICE
CERTIFICATE OF CORRECTION

Patent No. 3,461,130                    Dated   October 14, 1969

Inventor(s)   Siegfried Peterson et al

It is certified that error appears in the above-identified patent and that said Letters Patent are hereby corrected as shown below:

1. In column 1, lines 71 and 72, "3-chloro-1,4-naphthoquinone-2-malonic acid diethyl ester," has been deleted.

2. In column 4, line 45, Example VI, the formula has been changed to:

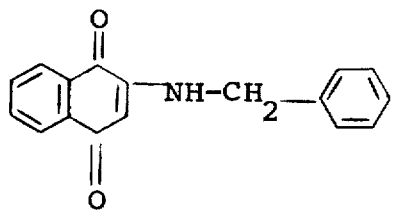

3. In column 5, Example IX, the formula has been changed to:

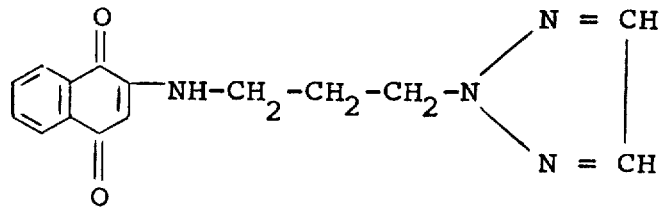

4. In column 5, Example X, the formula has been changed to:

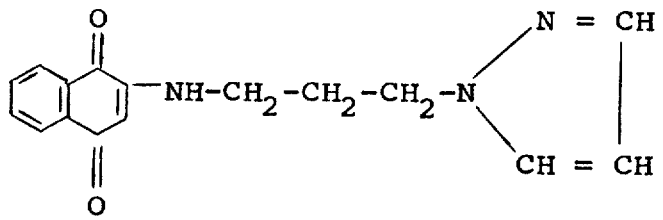

5. In column 8, Example XXV, the formula has been changed to: